United States Patent
Pitteri et al.

(10) Patent No.: US 6,521,709 B2
(45) Date of Patent: *Feb. 18, 2003

(54) POLYOLEFIN COMPOSITIONS COMPRISING A PROPYLENE POLYMER AND UHMWPE

(75) Inventors: Silvio Pitteri, Ferrara (IT); Miet Willems, Heverlee (BE)

(73) Assignee: Basell Poliolefine Italia S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,727

(22) PCT Filed: Sep. 4, 1998

(86) PCT No.: PCT/EP98/06319
§ 371 (c)(1),
(2), (4) Date: Aug. 19, 1999

(87) PCT Pub. No.: WO99/15586
PCT Pub. Date: Apr. 1, 1999

(65) Prior Publication Data
US 2002/0010241 A1 Jan. 24, 2002

(30) Foreign Application Priority Data
Sep. 22, 1997 (EP) .......................................... 97202891

(51) Int. Cl.⁷ .............................................. C08L 23/00
(52) U.S. Cl. ..................................................... 525/240
(58) Field of Search .......................................... 525/240

(56) References Cited

U.S. PATENT DOCUMENTS

| | | | | |
|---|---|---|---|---|
| 5,285,967 A | * | 2/1994 | Weidman | 239/80 |
| 5,537,742 A | * | 7/1996 | Le | 29/869 |
| 5,621,046 A | * | 4/1997 | Iwanami | 525/240 |
| 6,017,480 A | * | 1/2000 | Yoshida | 264/216 |

FOREIGN PATENT DOCUMENTS

EP    0 260 974 A    3/1988

OTHER PUBLICATIONS

Patent Abstracts of Japan, vol. 013, No. 042 (C–564), Jan. 30, 1989 & JP 63 241050 A (Mitsui Petrochem Ind Ltd) Oct. 6, 1988.
Patent Abstracts If Japan, vol. 008, No. 246 (C–251), Nov. 10, 1984 & JP 59 126446 A (Sekisu Kagaku Kogyo KK), Jul. 21, 1984.
Patent Abstracts of Japan, vol. 098, No. 001, Jan. 30, 1998 & JP 09 22734 A (Sumika Color KK), Sep. 2, 1997.
International Search Report for International Application PCT/EP 98/06319 IPC 6 C08L23/12.

\* cited by examiner

Primary Examiner—Paul R. Michl

(57) ABSTRACT

A polyolefin composition comprising from 10 to 95% by weight of a crystalline propylene polymer, A) having an MFR value equal to or lower than 60 g/10 min., and from 5 to 90% by weight of an ultra high molecular weight polyethylene, B) in form of particles having a mean particle size of from 300 to 10 $\mu$m.

10 Claims, No Drawings

POLYOLEFIN COMPOSITIONS COMPRISING A PROPYLENE POLYMER AND UHMWPE

The present invention concerns polyolefin compositions comprising a crystalline propylene polymer, preferably a homopolymer, and a ultrahigh molecular weight polyethylene (hereinafter called UHMWPE) in form of particles.

It is known in the art to blend UHMWPE with polyolefins having lower (i.e. conventional) molecular weights in order to obtain compositions having improved processability in the molten state with respect to pure UHMWPE.

In fact, due to its extremely high molecular weight, UHMWPE cannot be practically processed by the melt-processing techniques usually employed for thermoplastic polymers, such as screw extrusion or injection molding.

On the other hand, the addition of the said polyolefins with lower molecular weight, like polypropylene of polyethylene, while improving the melt-processability can also influence, to a variable extent, the mechanical properties of the resulting compositions.

According to the prior art, said compositions are generally obtained by way of multistep polymerization processes comprising at least one step in which the UHMWPE is prepared and at least one step in which the polyolefin with lower molecular weight is prepared.

Also the relative order of the said steps can be critical, according to the teaching of the prior art. In the European published patent application No 318 190 it is explained that said polymerization processes are capable of producing compositions wherein the UHMWPE is present in form of fine particles having an average diameter of 20 $\mu$m or less, which constitutes an essential condition for the obtainment of the effect of the invention.

Actually, the only example reported in the European patent application (Example 1) shows that the average diameter of the UHMWPE particles obtained by way of the said multistep polymerization processes, in the presence of a typical Ziegler-Natta catalyst supported on magnesium dichloride, is significantly lower than 10 $\mu$m, namely around 3 $\mu$m.

Said particles are dispersed in the polyolefin with lower molecular weight to form a sea-island structure.

According to the disclosure of the cited European patent application, the polyolefin with lower molecular weight has an intrinsic viscosity of 0.1–5 dl/g and the UHMWPE is present in an amount of 10–40% by weight based on the total weight of the composition.

No data relating to compositions wherein the polyolefin with lower molecular weight is polypropylene are reported.

In fact the therein exemplified polyolefin with lower molecular weight is polyethylene, which exerts a stronger surface interaction with the UHMWPE with respect to polypropylene.

Similar compositions, but containing higher amounts of UHMWPE, namely from 40 to 98% by weight based on the total weight of the composition, are disclosed in the Japanese published patent application No 59(1980)-120605, wherein the polyolefin with lower molecular weight is selected from polypropylene or poly-1-butene.

Also in this case the compositions are prepared by way of a multistep polymerization.

Moreover, in Comparative Example 2 of the said Japanese patent application it is shown that unacceptable mechanical properties are obtained when the said compositions are prepared by mechanically blending a propylene homopolymer having a Melt Flow Rate measured under standard conditions (MFR at 230° C., with 2.16 kg load) of 76 g/10 min. with UHMWPE in powder form, by way of an extrusion apparatus.

In fact the obtained sample does not display an appreciable value of elongation at break (a 0 value is reported), while its yield strength is very low (half the value of pure UHMWPE, as demonstrated by a comparison with Comparative Example 1).

On the other hand, the examples of the Japanese patent application show that the MFR of the therein prepared compositions are low, as demonstrated by the fact that only in the case of Example 5 a measurable MFR value (namely 0.11 g/10 min.) is obtained by using a load of 2.16 kg (the temperature being 190° C.).

In the other examples it is necessary to use heavier loads in order to obtain appreciable MFR values.

Taking into account that in the said Example 5 the MFR value of the polypropylene component (measured under the cited standard conditions) is as high as 82 g/10 min. and that the amount of UHMWPE is relatively low, when compared with the definition of the invention of the Japanese patent application (namely, it is 53% by weight), it is clear that, according to the teaching of the said patent application, the addition of polyolefins with high MFR values is not capable of raising the MFR of the final compositions over a relatively low limit.

Obviously, the melt-processability of a polymer material is strongly influenced by the MFR, which should be kept relatively high in order to achieve the best degree of processability.

On the other hand, it would also be preferable not to raise too much the MFR of the polyolefin with lower molecular weight, in order to avoid a worsening of the mechanical properties of the same, to the detriment of the properties of the final compositions.

The above advantages are achieved by the polyolefin compositions of the present invention, which comprise from 10 to 95% by weight of a crystalline propylene polymer A) having a MFR value (measured under the previously said standard conditions, namely 230° C., 2.16 kg load, according to ISO 1133) of 60 g/10 min. or less, and from 5 to 90% by weight of UHMWPE B) in form of particles having a mean particle size of from 300 to 10 $\mu$m.

In fact, the MFR of the compositions of the present invention is not inferior, for comparable amounts of UHMWPE, to the values reported by the said Japanese patent application, even when the MFR of A) is remarkably lower than the MFR of many propylene polymers used in the examples of the Japanese patent application.

For instance, in the case of a composition according to the present invention wherein the concentration of UHMWPE B) is of 50% by weight, a MFR value of 0.2-0.3 g/10 min. at 230° C. and 2.16 kg can be easily achieved by using a component A) having a MFR value of 15 g/10 min.

It has been determined by the Applicant that, when measured at 190° C. instead of 230° C., the said MFR values are generally halved, so that the corresponding values at 190° C. are 0.1–0.2 g/10 min. Consequently the compositions of the present invention are particularly suited for the production of formed articles by means of injection molding.

Moreover, the said compositions display satisfactory values of tensile strength at yield, elongation at yield, heat distortion temperature and Vicat softening point, which are generally higher than the values of the UHMWPE B), of flexural modulus, and particularly high levels of abrasion and wear resistance, and low values of coefficient of friction, when compared with pure polypropylene.

When elevated values of elongation at yield and at break and high levels of impact, abrasion and wear resistance are required, the compositions of the present invention preferably comprise from 10 to 60%, more preferably from 25 to 50%, in particular from 25 to 45% by weight of component A) and from 40 to 90%, more preferably from 50 to 75%, in particular from 55 to 75% by weight of component B).

When elevated values of flexural modulus and Vicat softening point and high levels of melt-processability are required, the compositions of the present invention preferably comprise from more than 60 to 95%, more preferably from 65 to 90%, in particular from 65 to 80% by weight of component A) and from 5 to less than 40%, more preferably from 10 to 35%, in particular from 20 to 35% by weight of component B).

In addition, the compositions of the present invention can optionally comprise a reinforcing agent C), such as glass fibers, carbon fibers, mineral fillers (as silica or talc, for instance), in amounts ranging from 2 to 20% by weight, preferably from 4 to 17% by weight with respect to the total weight of the sum of components A), B) and C.).

Other additives commonly used in the art, like nucleating agents, stabilizers, pigments, can be present in the compositions of the present invention.

In particular, it is possible to add to the compositions of the present invention reduced amounts (generally from 0.5 to 2% by weight with respect to the total weight of the composition) of a polyolefin, like a propylene homo- or copolymer, containing polar monomers in grafted form. Examples of polar monomers are maleic anhydride, itaconic anhydride, maleic acid, fumaric acid, itaconic acid and $C_1$–$C_{10}$ linear and branched dialkyl esters of said acids.

The polar monomers are generally grafted on the said polyolefin in amounts ranging from 0.4 to 1.5% by weight with respect to the total weight of the grafted polyolefin. Comparable amounts of polar monomers in free form can also be present in addition.

The mean particle size of B) is determined with the method described in the examples. It is preferably in the range from 300 to 30 $\mu$m, more preferably from 150 to 50 $\mu$m.

The particles of component B) are dispersed in the component A), which constitutes a polymer matrix and is generally in form of continuous phase.

The MFR of A) is preferably equal to or lower than 50g/10 min., in particular it is in the range from 50 to 1 g/10 min., more preferably it is equal to or less than 25 g/10 min., in particular it is more preferably in the range from 25 to 4 g/10 min.

Moreover, in the absence of additional reinforcing agents, the compositions of the present invention are preferably characterized by values of tensile strength at yield (measured according to ISO 527-2) equal to or higher than 15 MPa, more preferably equal to or higher than 20 MPa, in particular from 20 to 40 MPa, values of elongation at yield (measured according to ISO 527-2) equal to or higher than 6%, more preferably equal to or higher than 8%, in particular from 10 to 30%, values of Izod impact strength at 23° C. (measured according to ISO 180/1A) equal to or higher than 3 kJ/m$^2$, more preferably equal to or higher than 4 kJ/m$^2$, in particular from 4 to 20 kJ/m$^2$, values of flexural modulus (measured according to ISO 178) equal to or higher than 750 MPa.

The flexural modulus can be sensibly increased by adding the reinforcing agents, in particular glass fibers, in which case it can preferably range from 2000 to 5000 MPa.

The component A) is preferably a propylene homopolymer, but it can also be a propylene copolymer containing minor amounts (up to 5% by weight) of comonomers, in particular selected from ethylene and α-olefins $C_4$-$C_{10}$, as 1-butene, l-pentene, 1-hexene, 4-methyl-1-pentene, 1-octene, 1-decene.

When it is a propylene homopolymer, the component A) preferably contains an amount of fraction insoluble in xylene at 25° C. equal to or greater than 94% by weight, more preferably equal to or greater than 96% by weight; when it is a copolymer, it preferably contains an amount of fraction insoluble in xylene at 25° C. equal to or greater than 85% by weight. The component A) can have narrow to broad molecular weight distribution, provided that its MFR be within the above said limits.

Indicatively, the $M_w/M_n$, values for component A) can range from 2 to 60.

The values of flexural modulus of the component A) can indicatively range from 800 to 3000 MPa, measured according to the above specified standard.

A particular example of component A) is a propylene polymer, in particular a homopolymer, having a broad molecular weight distribution in terms of $M_w/M_n$, namely having $M_w/M_n$ values equal to or higher than 5, in particular from 5 to 60, more preferably from 6 to 30.

The flexural modulus of said component A) with broad molecular weight distribution is generally equal to or higher than 1800 MPa, while the fraction insoluble in xylene at 25° C. of said component A) with broad molecular weight distribution is preferably equal to or greater that 98% by weight.

Such a component A) with broad molecular weight distribution confers superior mechanical and Theological properties to the compositions of the present invention.

In particular, the flexural modulus, the tensile strength at yield and the spiral flow (which is a test method commonly used to evaluate the flowability in the molten state and, consequently, the melt-processability) of the compositions of the invention are improved when a component A) with broad molecular weight distribution is used.

The above said propylene polymers constituting the component A) are well known in the art and commercially available.

They can be prepared by using, for instance, the catalysts and polymerization processes described in the European patent No 45977.

The UHMWPE constituting the component B) is an ethylene homopolymer or a copolymer of ethylene containing 40% by weight or less, preferably 20% by weight or less of comonomers, selected in particular from α-olefins $C_3$–$C_{10}$, as propylene, 1-butene, 1-hexene, 4-methyl-1-pentene, 1-octene, 1-decene.

Other comonomers that can be present in the copolymer are dienes.

The molecular weight of component B) is in the range usually recognized in the art for UHMWPE grades.

Generally, the intrinsic viscosity in decahydronaphthalene at 135° C. of component B) is in the range from 10 to 40 dl/g, preferably from 18 to 40 dl/g, more preferably from 18 to 35 dl/g.

In terms of viscosity-average molecular weights ($M_v$) the above ranges of intrinsic viscosity approximately correspond to the $M_v$ ranges from $1 \times 10^6$ to $6 \times 10^6$, from $3 \times 10^6$ to $6 \times 10^6$ and from $3 \times 10^6$ to $5 \times 10^6$ respectively.

The said UHMWPE polymers constituting the component B) are well known in the art and commercially available.

They can be prepared by using in polymerization a Ziegler-Natta catalyst comprising the reaction product between TiCl₃ and an Al-alkyl compound, in particular diethylaluminum chloride.

Other catalysts that can be used are those comprising the reaction product between a solid component comprising a titanium compound supported on a magnesium dihalide, in particular MgCl$_2$, and an Al-alkyl compound, in particular triethylaluminum.

The polymerization is generally carried out in the absence or in the presence of reduced amounts of molecular weight regulators, like hydrogen.

Examples of catalysts and polymerization processes that can be used for producing the component B) are given in the European published patent applications No 523657 and No 606908.

Examples of commercial UHMWPE polymers that can be used as component B) according to the present invention are the 1900 grades 1900H (with mean particle size of 215 μm), HB 312CM (with mean particle size of 120 μm) and HB320CM (with mean particle size of 96 μm), all marketed by Montell.

The compositions of the present invention can be easily prepared by mixing the component B) in form of powder having the above said mean particle size with the component A) in the molten state.

For this purpose any suited apparatus available in the art, as for instance twin screw extruders, can be used.

The particle size of the powder of component B) does not undergo a significant change as a consequence of the mixing process.

Even if the said technique is preferred, because it enables to obtain without difficulties the compositions of the present invention by mixing commercially available components, in principle there is nothing to prevent use of a multistep polymerization process, provided that it is capable of yielding a final composition wherein the component B) is in form of particles having a mean particle size falling within the definition of the present invention.

Thanks to their valuable set of properties, the compositions of the present invention are particularly suited for use in fields wherein good mechanical properties, high abrasion and wear resistance and good melt-processability are required, like for gears, scratch resistant articles, sheets for floor covering, wear resistant sheets..

The following examples are given in order to illustrate and not limit the present invention.

In the following examples, all the percentage values are by weight.

EXAMPLE 1

Sample 1.1

49.9% of a propylene homopolymer (PP) with melt flow rate of 15 g/10 min., fraction insoluble in xylene at 25° C. of about 98.5% by weight and MdM, of about 9, 49.9% of UHMWPE HB 312 CM with intrinsic viscosity (measured at 135° C. in decahydronaphthalene) of 20 dl/g and mean particle size of 120 μm, and 0.2% stabiliser B225 (from CIBA) were melt blended and pelletised by a Maris 45 twin-screw extruder (40–50 kg/h) using the following extrusion conditions:

Barrel temperatures: 190-180-180-200-220-220-230-240-240° C. (die)
Melt temperature: 273° C.
Screw speed: 240 rpm
Output: 50 kg/h
Die pressure: 24 bar

Sample 1.2

34.9% of the same propylene homopolymer as in Sample 1.1, 64.9% of the same UHMWPE as in Sample 1.1 and 0.2% stabiliser B225 were melt blended and pelletised by a Maris 45 twin-screw extruder (40–50 kg/h) according to the following extrusion conditions:

Barrel temperatures: 190-180-180-200-220-220-230-240-250° C. (die)
Melt temperature: 282° C.
Screw speed and output: same as for Sample 1.1
Die pressure: 31 bar

Sample 1.3

45.9% of the same propylene homopolymer as in Sample 1.1, 45.9% of the same UHMWPE as in Sample 1.1, 0.2% B225, 7% glass fibres (length 4.5 mm, diameter 14 μm) and 1% of Qestron KA 805 (from MONTELL) were melt blended and pelletised by a Maris 45 twin-screw extruder (40–50 kg/h) according to the following extrusion conditions:

Barrel temperatures: same as for Sample 1.2
Melt temperature: 283° C.
Screw speed and output: same as for Sample 1.1
Die pressure: 31 bar The Qestron KA 805 is an heterophasic copolymer of propylene containing 13% by weight of ethylene and about 0.6% by weight of grafted maleic anhydride and about 0.4% by weight of maleic anhydride in free form.

Sample 1.4

43.5% of the same propylene homopolymer as in Sample 1.1, 43.5% of the same UHMWPE as in Sample 1.1 and 13% of the same glass fibres as in Samples 1.3 are pelletised by a ZSK 25 Werner and Pliederer twin-screw extruder (with screw diameter of 25 mm, L/D ratio of 48) according to the following extrusion conditions:

Barrel temperatures: 185-190-195-200-205-210-210-210-210-210-210° C.
Melt temperature: 220° C.
Screw speed: 200 rpm Tensile, flexural and izod impact test specimens were produced by injection moulding the said Samples 1.1 to 1.4 on the Netstal Neomat HP 1200 graphtrack injection moulding machine using the injection moulding conditions listed below.

Cylinder temperatures: 245-250-255° C.
Nozzle and melt temperature: 255° C.
Mould temperature: 60° C.
Injection speed-time pressure: 75-100 mm/s -0.72-1 s -770-1300 bar Taber abrasion samples (150×100×2 mm) were injection moulded on the Mannesmann Demag type D150-452 NC III P injection moulding machine.

Testing of the samples was performed according to the test methods hereinafter described.

The test results are reported in Table 1.

When measured at 190° C., 2.16 kg load, the MFR of Sample 1.1 is 0.15 g/10 min.

EXAMPLE 2

Sample 2.1

70% of a propylene homopolymer (PP) with melt flow rate of 15 g/10 min., fraction insoluble in xylene at 25° C.

of about 96% by weight and Mw/Mn of 6.7, and 30% of UHMWPE HB 320 CM with intrinsic viscosity (measured at 135° C. in decahydronaphthalene) of 28 dl/g and mean particle size of 96 μm are mixed and pelletised using a Berstorff ZE-5 type twin-screw extruder (with co-rotating screws, diameter screw of 25 mm, L/D ratio of 30:1). The extrusion conditions used are the following:

Barrel temperatures: 185-190-195-200-205-210° C.
Melt temperature: 220° C.
Screw speed: 210 rpm
Die pressure: 25 bar Sample 2.2

50% of the same propylene homopolymer as in Sample 2.1 and 50% of the same UHMWPE as in Sample 2.1 are mixed and pelletised following the same procedure as for Sample 2.1.

The extrusion conditions used are the following:
Barrel temperatures and melt temperature, screw speed: same as for Sample 2.1
Die pressure: 30 bar Sample 2.3

35% of the same propylene homopolymer as in Sample 2.1 and 75% of the same UHMWPE as in Sample 2.1 are mixed and pelletised following the same procedure as for Sample 2.1.

The extrusion conditions used are the following:
Barrel temperatures and melt temperature, screw speed: same as for Sample 2.1
Die pressure: 45 bar Sample 2.4

10% of the same propylene homopolymer as in Sample 2.1 and 90% of the same UHMWPE as in Sample 2.1 are mixed and pelletised using the same procedure as for Sample 2.1. The extrusion conditions used are the following:

Barrel temperatures and melt temperature, screw speed: same as for Sample 2.1
Die pressure: 80 bar The procedure of Example 1 for producing and testing the test specimens was followed.

The test results are reported in Table 2.

EXAMPLE 3

50% of the same propylene homopolymer as in Example 1 and 50% of UHMWPE 1900HCM with intrinsic viscosity (measured at 135° C. in decahydronaphthalene) of 29 dl/g and mean particle size of 215 μm are mixed in a tumbler mixer for 15 minutes and pelletised using a Berstorff ZE-5 type twin-screw extruder (with co-rotating screws, diameter screw of 25 mm, L/D ratio of 30:1). The extrusion conditions used are the following:

Barrel temperatures: 185-190-195-200-205-210° C.
Melt temperature: 220° C.
Screw speed: 210 rpm
Die pressure: ±30 bar The procedure of Example 1 was followed for producing and testing the test specimens.

The test results are reported in Table 3.

TABLE 1

| Property | PP | Sample 1.1 | Sample 1.2 | Sample 1.3 | Sample 1.4 | UHMWPE |
|---|---|---|---|---|---|---|
| MFR, g/10 min., 2.16 kg | 15 | 0.3 | NM | — | — | — |
| MFR, g/10 min., 10 kg | — | 34.6 | 4.9 | 16.6 | — | — |
| IV in tetrahydronaphthalene, dl/g | ca. 2 | ca 7.3 | — | — | — | ca. 11 |
| IV in decahydronaphthalene, dl/g | — | — | — | — | — | 20 |
| Density, g/cm$^3$ | 0.9 | 0.92 | 0.93 | — | — | 0.93 |
| Tensile modulus, MPa | 2130 | 1185 | 1080 | 2260 | 3165 | — |
| Tensile strength at yield, MPa | 41 | 29 | 26 | — | — | 19 |
| Elongation at yield, % | 6 | 11 | 15 | — | — | 6 |
| Tensile strength at break, MPa | 34 | 28 | 24 | 42 | 47 | 40 |
| Elongation at break, % | 16 | 18 | 52 | 5 | 3 | 310 |
| Flexural modulus, MPa | 2238 | 1297 | 1103 | 2119 | 3150 | 750 |
| Notched Izod impact at 23° C., KJ/m$^2$ | 2.5 | 3.3 | 5.7 | 5.6 | 4.6 | no break |
| Taber abrasion resistance, mg weight loss after 1000 cycles | 45 | 22 | 17 | 26 | 28 | |
| COF | — | 0.22 | 0.20 | 0.20 | — | — |
| Wear factor K against steel 10$^{-15}$m$^3$/Nm | — | 0.59 | 0.19 | 0.37 | — | — |
| Wear factor K against itself, 10$^{-15}$m$^3$/Nm | — | — | <0.1 no wear | 4.5 | — | — |
| HDT at 1.8 MPa, ° C. | 69 | 53 | 50 | 92 | — | 46 |
| Vicat SP, ° C. | 157 | 140 | 138 | 151 | — | 134 |

SP: softening point
NM: not measurable

TABLE 2

| Property | PP | Sample 2.1 | Sample 2.2 | Sample 2.3 | Sample 2.4 | UHMWPE |
|---|---|---|---|---|---|---|
| MFR, g/10 min., 2.16 kg | 15 | 2.8 | 0.2 | NM | NM | NM |
| IV in tetrahydronaphthalene, dl/g | 2.1 | 7.6 | 8.8 | — | — | — |
| IV in decahydronaphthalene, dl/g | — | — | — | — | — | 29 |
| Density, g/cm$^3$ | 0.9 | — | 0.92 | 0.93 | 0.93 | 0.93 |
| Tensile modulus, MPa | 1350 | 1220 | 1090 | 870 | 770 | — |
| Tensile strength at yield, MPa | 34 | 30 | 28 | 23 | 22 | 19 |
| Elongation at yield, % | 11 | 11 | 15 | 18 | 16 | 6 |
| Tensile strength at break, MPa | 19 | 25 | 24 | 21 | 22 | 40 |
| Elongation at break, % | 355 | 30 | 42 | 56 | — | 320 |
| Flexural modulus, MPa | 1345 | 1235 | 1125 | — | — | 750 |
| Notched Izod impact at 23° C., KJ/m$^2$ | 2.0 | 3.8 | 4.5 | 7.9 | NB | NB |
| Taber abrasion resistance, mg weight loss after 1000 cycles | 43 | 28 | 23 | 17 | 23 | — |
| Vicat SP,° C. | 151 | — | 138 | — | — | 134 |

SP: softening point
NM: not measurable
NB: no breakage

TABLE 3

| Property | |
|---|---|
| MFR, g/10 min., 2.16 kg | 0.63 |
| IV in tetrahydronaphthalene, dl/g | 11.1 |
| Tensile modulus, MPa | 1080 |
| Tensile strength at yield, MPa | 28 |
| Elongation at yield, % | 14 |
| Tensile strength at break, MPa | 25 |
| Elongation at break, % | 37 |
| Flexural modulus, MPa | 1135 |
| Notched Izod impact at 23° C., KJ/m$^2$ | 4.2 |
| Taber abrasion resistance, mg weight loss after 1000 cycles | 30 |

Test Methods for the Determination of the Mean Particle Size of UHMWPE

A Coulter Multisizer apparatus is used.
Sample Preparation

Use a 100 ml beaker and prepare a solution of 3 droplets of the 1% (w/w) "Coulter" dispersant, in 80 ml of water. Take care that no foam is formed: air bubbles will be detected as particles. If there is foam add 2 cc of methanol. Thereafter, add 6 grams of UHMWPE powder while stirring the solution using a magnetic stirring bar. Leave the solution under slow stirring for ca. 10 min.
Measuring Conditions Choose appropriate aperture (560 tube large application range 20–400 μm) for the analysis of the suspension and select resolution (e.g. 16, 128 or 256 channels for the multisizer). Calibrate the instrument with the corresponding latex sample. Use the appropriate stirrer speed for the homogenisation and reproducibility of the sample. Perform three repeat measurements per sample and measure three different samples.

Test Methods for PP and UHMWPE/PP Pellets and Injection Moulded Specimens

Melt flow rates (MFR) were determined at a temperature of 230° C. and a load of respectively 2.16 kg and 10 kg (ISO 1133).

Intrinsic viscosity (IV) measurements were performed at 135° C. in tetrahydronaphthalene.

Density was measured with the density gradient column method according to ISO 1183/D Tensile and flexural properties were determined on an Instron testing machine according to the ISO 527-2 and ISO 178 methods respectively.

Notched Izod impact strengths were measured at 23° C. using a Zwick Impact testing instrument equipped with a 1 Joule hammer according to ISO 180/1A.

Heat distortion temperature (HDT) was measured at 23° C. on samples placed edgewise according to ISO 75A, using a load of 1.8 MPa.

The Vicat softening point was determined according to the ISO 306/A method, using a force of 10N and a heating rate of 50° C.

Abrasion resistance was measured on injection moulded square plaques (100×100×2 mm) with a Taber Abrader apparatus according to ASTM D1044-85. The weight loss after 1000 cycles, under a load of 2×1 kg, was calculated. Resilient calibrase wheels No. CS-17, composed of rubber and aluminium oxide abrasive particles, were selected as abrasion wheels.

Tribological tests were carried out using a pin-on-disc test method based on ISO 7148/2. Sliding against steel and against polymer (itself) were performed. Wear resistance, coefficient of friction (COF) and temperature of the disc are measured during 20 hours. A pin with dimensions of 10×10× 3.7 mm, cut out of a HDT bar of the test material, was pushed with a controlled force against a rotating disk. Depending on the test, the disk is either composed of the test material or of hardened steel (100 Cr6, hardness 58 HRC, roughness 0.1 μm). The disk dimensions are 90×16 mm for steel and 90×3.2 mm for the test material. The disk rotates with a velocity of 0.2 m/s and a contact pressure of 2 Mpa. Tests were performed at ambient temperature (20–25° C.) and relative humidity between 40 and 60%. From the constant heating rate and sliding speed of the disk, the corresponding sliding distance is calculated. Given the pressure applied, this allows the calculation of the wear factor K in m$^3$/Nm.

Test Methods for UHMWPE Pellets and Compression Moulded Specimens

Intrinsic viscosity (IV) measurements were performed at 135° C. in decahydronaphthalene according to ASTM D1601

Density: ASTM D792

Tensile properties: ASTM D638

Flexural modulus, 1% secant: ASTM D790B

Heat distortion temperature (HDT): ASTM D 648

The Vicat softening point was determined according to ASTM D1525B

Abrasion resistance: same as above

What is claimed is:

1. A polyolefin composition comprising from 10 to about 95% of a crystalline propylene polymer A) having an MFR value from 60 to 1 g/10 min and from 5 to 90% by weight of an ultra high molecular weight polyethylene B) in the form of particles having a mean particle size of from 300 to 10 μm.

2. The polyolefin composition of claim 1, comprising from 10 to 60% by weight of A) and from 40 to 90% by weight of B).

3. The polyolefin composition of claim 1, comprising from more than 60 to 95% of A) and from 5 to less than 40% of B).

4. The polyolefin composition of claim 1, further comprising a reinforcing agent C.) in amounts ranging from 2 to 20% by weight with respect to the total weight of the sum of components A), B) and C).

5. The polyolefin composition of claim 4, further comprising from 0.5 to 2% by weight, with respect to the total weight of the composition, of a polyolefin containing polar monomers in grafted form.

6. The polyolefin composition of claim 1, wherein the component A) is a propylene homopolymer containing an amount of fraction insoluble in xylene at 25° C. equal to or greater than 94% by weight.

7. The polyolefin composition of claim 1, wherein the component A) is a propylene homopolymer having Mw/Mn values equal to or higher than 5.

8. The polyolefin composition of claim 1, wherein the component B) is an ethylene homopolymer or a copolymer of ethylene containing 40% by weight or less of comonomers.

9. The polyolefin composition of claim 1, wherein the component B) has an intrinsic viscosity of from 10 to 40 dl/g.

10. Formed articles having high resistance to abrasion and wear, made of or containing the polyolefin composition of claim 1.

* * * * *

UNITED STATES PATENT AND TRADEMARK OFFICE
CERTIFICATE OF CORRECTION

PATENT NO. : 6,521,709 B2
DATED : February 18, 2003
INVENTOR(S) : Silvio Pitteri et al.

It is certified that error appears in the above-identified patent and that said Letters Patent is hereby corrected as shown below:

<u>Column 11,</u>
Line 12, change "90%" to -- 95% --.

Signed and Sealed this

Fourth Day of November, 2003

JAMES E. ROGAN
*Director of the United States Patent and Trademark Office*